United States Patent
Choi et al.

(10) Patent No.: US 9,050,743 B2
(45) Date of Patent: Jun. 9, 2015

(54) MULTILAYER FILM

(75) Inventors: MoonJung Choi, Seoul (KR); MinHo Jeon, Daejeon (KR); JiEun Yoo, Daejeon (KR); MyungAhn Ok, Daejeon (KR); KwangJin Chung, Daejeon (KR)

(73) Assignee: SK INNOVATION CO., LTD. (KR)

( * ) Notice: Subject to any disclaimer, the term of this patent is extended or adjusted under 35 U.S.C. 154(b) by 367 days.

(21) Appl. No.: 13/287,498

(22) Filed: Nov. 2, 2011

(65) Prior Publication Data

US 2012/0183779 A1  Jul. 19, 2012

(30) Foreign Application Priority Data

Jan. 18, 2011  (KR) .......................... 10-2011-0004855

(51) Int. Cl.
| | |
|---|---|
| *B32B 27/36* | (2006.01) |
| *B32B 27/08* | (2006.01) |
| *B32B 37/15* | (2006.01) |
| *B29C 47/04* | (2006.01) |
| *B29C 49/04* | (2006.01) |

(Continued)

(52) U.S. Cl.
CPC .......... *B29C 47/065* (2013.01); *B32B 2367/00* (2013.01); *B32B 2250/03* (2013.01); *B32B 2250/246* (2013.01); *B32B 37/153* (2013.01); *B29C 47/06* (2013.01); *B32B 2250/24* (2013.01); *C08G 64/0208* (2013.01); *Y10T 428/24975* (2015.01); *B32B 2309/02* (2013.01); *B32B 37/15* (2013.01); *B32B 27/36* (2013.01); *B29C 49/04* (2013.01); *B29C 2049/044* (2013.01); *B29C 47/04* (2013.01); *B32B 27/08* (2013.01); *B32B 2250/40* (2013.01); *B29C 47/0004* (2013.01); *B29C 47/0021* (2013.01); *B29C 47/0026* (2013.01); *B29K 2069/00* (2013.01); *B29K 2105/0085* (2013.01); *B29C 2947/92704* (2013.01); *B29C 2947/92809* (2013.01); *B29C 2947/92904* (2013.01); *B32B 27/365* (2013.01); *B32B 2439/00* (2013.01)

(58) Field of Classification Search
None
See application file for complete search history.

(56) References Cited

U.S. PATENT DOCUMENTS

| | | | | |
|---|---|---|---|---|
| 3,585,168 | A | * | 6/1971 | Shohei Inoue et al. ....... 528/371 |
| 3,706,713 | A | * | 12/1972 | Hull et al. ..................... 528/413 |

(Continued)

FOREIGN PATENT DOCUMENTS

| | | |
|---|---|---|
| JP | 2005329557 | 12/2005 |
| JP | 2006-036954 | * 2/2006 |

(Continued)

OTHER PUBLICATIONS

Yiwang Chen et al., Study on Biodegradable Aromatic/Aliphatic Copolyesters, Brazilian Journal of Chemical Engineering, 2008, pp. 321-335.

*Primary Examiner* — Vivian Chen
(74) *Attorney, Agent, or Firm* — Cantor Colburn LLP

(57) ABSTRACT

Provided is a molded body in which at least one surface layer made of a copolyester polymer is laminated on one surface or both surfaces of a base layer made of aliphatic polycarbonate. When coextruding aliphatic polycarbonate and copolyester polymer, two layers adhere well to each other and are hardly delaminated from each other even without an adhesive and a tie layer, oxygen barrier property and low-temperature heat seal property can be provided as compared with a case where the copolyester polymer alone is used, the cost can be reduced because a separate adhesive or a tie layer is not required, and the manufacturing cost can be significantly reduced because the constitution of layers is simplified.

2 Claims, 1 Drawing Sheet

(51) Int. Cl.
  *C08G 64/02*  (2006.01)
  *B29C 47/06*  (2006.01)
  *B29C 47/00*  (2006.01)
  *B29K 69/00*  (2006.01)
  *B29K 105/00*  (2006.01)

(56) References Cited

U.S. PATENT DOCUMENTS

| | | | | |
|---|---|---|---|---|
| 4,066,630 | A * | 1/1978 | Dixon et al. | 525/405 |
| 4,145,525 | A * | 3/1979 | Dixon et al. | 525/410 |
| 4,665,136 | A * | 5/1987 | Santangelo et al. | 525/523 |
| 4,851,507 | A * | 7/1989 | Kesling et al. | 528/405 |
| 4,861,630 | A | 8/1989 | Mihalich | |
| 5,391,423 | A * | 2/1995 | Wnuk et al. | 428/217 |
| 5,536,806 | A * | 7/1996 | Sant'Angelo | 528/196 |
| 5,585,177 | A * | 12/1996 | Okamura et al. | 428/341 |
| 5,895,723 | A * | 4/1999 | Utz | 428/480 |
| 6,316,576 | B1 | 11/2001 | Fujimori et al. | 528/196 |
| 6,576,694 | B1 * | 6/2003 | Liu et al. | 524/291 |
| 6,599,577 | B2 | 7/2003 | Zhao et al. | 427/386 |
| 6,680,359 | B2 * | 1/2004 | Schoenheider | 525/523 |
| 6,746,757 | B1 | 6/2004 | Takagi et al. | 428/213 |
| 6,815,529 | B2 * | 11/2004 | Zhao et al. | 528/405 |
| 6,900,767 | B2 * | 5/2005 | Hattori | 343/702 |
| 7,138,479 | B2 * | 11/2006 | Dhara et al. | 528/196 |
| 7,144,632 | B2 * | 12/2006 | Hayes | 428/423.7 |
| 7,148,317 | B2 * | 12/2006 | Moon et al. | 528/405 |
| 7,176,251 | B1 * | 2/2007 | Bastioli et al. | 524/47 |
| 7,405,265 | B2 * | 7/2008 | Moon et al. | 528/414 |
| 7,671,164 | B2 * | 3/2010 | Brack et al. | 528/190 |
| 7,718,755 | B2 * | 5/2010 | Chatterjee et al. | 528/196 |
| 7,728,099 | B2 * | 6/2010 | Luinstra | 528/196 |
| 7,972,822 | B2 * | 7/2011 | Gross et al. | 435/135 |
| 8,324,337 | B2 * | 12/2012 | Allen | 528/200 |
| 8,487,038 | B2 * | 7/2013 | Noordover et al. | 524/590 |
| 2002/0107357 | A1 * | 8/2002 | Schoenheider | 528/370 |
| 2004/0126588 | A1 * | 7/2004 | Schoenheider | 428/412 |
| 2005/0163944 | A1 * | 7/2005 | Isshiki et al. | 428/32.39 |
| 2005/0272904 | A1 * | 12/2005 | Moon et al. | 528/198 |
| 2005/0288452 | A1 * | 12/2005 | Wakaki et al. | 525/450 |
| 2006/0074218 | A1 * | 4/2006 | Moon et al. | 528/297 |
| 2007/0117908 | A1 * | 5/2007 | Zhou et al. | 524/492 |
| 2007/0123612 | A1 * | 5/2007 | Bastioli et al. | 524/47 |
| 2009/0234042 | A1 * | 9/2009 | Luinstra | 523/105 |
| 2010/0323201 | A1 * | 12/2010 | Son et al. | 428/412 |
| 2011/0311794 | A1 * | 12/2011 | Zhou et al. | 428/216 |
| 2012/0058346 | A1 * | 3/2012 | Jeon et al. | 428/412 |
| 2012/0288709 | A1 * | 11/2012 | Jeon et al. | 428/349 |
| 2013/0184398 | A1 * | 7/2013 | Choi et al. | 524/539 |

FOREIGN PATENT DOCUMENTS

| | | | |
|---|---|---|---|
| WO | WO 98/07782 | * | 2/1998 |
| WO | WO 2010/145045 | * | 12/2010 |

* cited by examiner

MULTILAYER FILM

CROSS-REFERENCE TO RELATED APPLICATIONS

This application claims priority under 35 U.S.C. §119 to Korean Patent Application No. 10-2011-0004855, filed on Jan. 18, 2011, in the Korean Intellectual Property Office, the disclosure of which is incorporated herein by reference in its entirety.

TECHNICAL FIELD

The present invention relates to a multilayer film manufactured by coextruding aliphatic polycarbonate and copolyester polymer and a method for manufacturing the same.

BACKGROUND

Aliphatic polycarbonate is excellent in oxygen-barrier property, transparency, and the like, but the aliphatic polycarbonate is difficult to use in a single film due to a low glass transition temperature (Tg), which needs to be, in most cases, laminated with other resin at the time of use. However, in order to make the aliphatic polycarbonate be laminated with other kinds of resin such as polyethylene (PE), polypropylene (PP), or the like, lamination needs to be performed by using an appropriate adhesive capable of adhering two kinds of resin to each other or coextrusion needs to be performed by using a tie layer. Meanwhile, the copolyester polymer can be variously used as films, sheets, fibers, or the like, due to biodegradability and inherent physical properties thereof, but is limited in a packaging field requiring prevention of acidification due to large oxygen permeability thereof.

SUMMARY

An embodiment of the present invention is directed to providing a multilayer film having an excellent adhesive strength between interfaces of two resins and no longer requiring a separate adhesive or tie layer, by coextruding aliphatic polycarbonate and copolyester polymer.

Specifically, the present invention can impart excellent oxygen barrier property and low-temperature heat adhesive property, as compared with a molded body using a copolyester polymer, and provide a molded body capable of reducing the cost of raw materials because an adhesive or a tie layer is not required and significantly reducing the manufacturing cost because the constitution of layers is simplified.

The present invention is directed to a molded body in which at least one surface layer made of a copolyester polymer is laminated on one surface or both surfaces of a base layer made of aliphatic polycarbonate, and more specifically to a sheet type or a film type of multilayer film.

The present inventors confirmed that, when coextruding aliphatic polycarbonate and copolyester polymer, two layers adhere well to each other and are hardly delaminated from each other even without an adhesive and a tie layer, and as a result, completed the present invention.

Therefore, the present inventors found that, in a case where aliphatic polycarbonate and copolyester polymer are laminated in a multilayer structure, oxygen barrier property and low-temperature heat seal property can be provided as compared with a case where the copolyester polymer alone is used. Here, the cost of raw materials can be reduced because a separate adhesive or a tie layer is not required and the manufacturing cost can be significantly reduced because the constitution of layers is simplified, even during a multilayer film manufacturing procedure.

In addition, when a molded body having this lamination structure of aliphatic polycarbonate and copolyester polymer thus formed, that is, a multilayer film retains excellent film characteristics of the copolyester polymer, such as tensile property and tear property, and exhibit excellent barrier characteristics of the aliphatic polycarbonate, and thus, the multilayer film can be used as a moisture and oxygen barrier film.

According to one general aspect of the present invention, a two-layer structure of film or sheet in which a surface layer made of a copolyester polymer is laminated on one surface of a base layer made of aliphatic polycarbonate.

According to another general aspect of the present invention, a three-layer structure of film or sheet in which surface layers made of a copolyester polymer are laminated on both surfaces of the base layer made of aliphatic polycarbonate.

In the present invention, the lamination means to be formed by coextrusion, and since adhesive property between aliphatic polycarbonate and copolyester polymer is excellent, the aliphatic polycarbonate and the copolyester polymer are laminated through coextrusion to provide a multilayer film having excellent adhesive property even without an adhesive layer or a tie layer. Hereinafter, constitutions of the present invention will be described in more detail.

In the present invention, as the aliphatic polycarbonate, polycarbonate copolymer or terpolymer obtained by reacting carbon dioxide and one, or two or more kinds of epoxide compounds may be used. Here, as the epoxide compound, one or more selected from the group consisting of (C2-C10) alkylene oxide substituted or unsubstituted with halogen or alkoxy; (C4-C20) cycloalkylene oxide substituted or unsubstituted with halogen or alkoxy; and (C8-C20) styrene oxide substituted or unsubstituted with halogen, alkoxy, alkyl, or aryl may be used. Specific examples of the alkoxy may include alkyloxy, aryloxy, aralkyloxy, and the like, and specific examples of the aryloxy may include phenoxy, bipheyloxy, naphthyloxy, and the like. The alkoxy, alkyl, and aryl may have a substituent selected from halogen atoms and alkoxy groups.

In the present invention, specific examples of the epoxide compound may include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxide-7-octene, epifluorohydrin, epichlorohydrin, epibromohydrin, isopropyl glycidyl ether, butyl glycidyl ether, t-butyl glycidyl ether, 2-ethylhexylglycidyl ether, allyl glycidyl ether, cyclopenetene oxide, cyclohexene oxide, cyclooctene oxide, cyclododecene oxide, alpha-pinene oxide, 2,3-epoxide norbornene, lemonene oxide, dieldrine, 2,3-epoxidepropylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxidepropyl ether, epoxypropyl methoxyphenyl ether, biphenyl glycidyl ether, glycidyl naphthyl ether, and the like.

The polycarbonate copolymer or terpolymer may be polymerized by using solution polymerization or bulk polymerization, and more specifically, may be polymerized by using an organic solvent as a reaction medium in the presence of one or more kinds of epoxide compounds and catalyst while carbon dioxide is inputted. As the solvent, one alone or a combination of two or more selected from aliphatic hydrocarbons, such as pentane, octane, decane, cyclohexane, and the like, aromatic hydrocarbons, such as benzene, toluene, xylene, and the like, and halogenated hydrocarbons, such as chloromethane, methylene chloride, chloroform, carbontetrachloride, 1,1-dichloroethane, 1,2-dichloethane, ethylchloride, trichloroethane, 1-chloropropane, 2-chloropropane, 1-chlorobutane, 2-chlorobutane, 1-chloro-2-methylpropane, chlorobenzene, bromobenzene, and the like, may be used. A pressure of the carbon dioxide is possible from an atmospheric pressure to 100 atm, and preferably from 5 atm to 30 atm. A polymerization temperature at the time of copolymerizing reaction may be 20 to 120° C., and preferably 50 to 90° C. More preferably, bulk polymerization using a monomer itself as a solvent may be performed.

The aliphatic polycarbonate copolymer may have a glass transition temperature (Tg) of 0 to 40° C., and the terpolymer may have a glass transition temperature of 40 to 110° C.

More specifically, as the aliphatic polycarbonate, polyalkylene carbonate may be used, and particularly, polypropylene carbonate may be advantageous in order to manufacture a multilayer film capable of expressing high oxygen barrier property.

In the present invention, the copolyester polymer may use one or more selected from the group consisting of copolyesters of Chemical Formula 1 below: specifically, poly(butylene adipate-co-terephthalate) (PBAT) or poly(butylene succinate) (PBS) may be used.

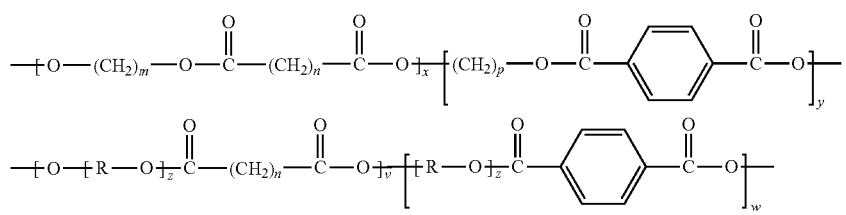

[Chemical Formula 1]

[wherein, —[R—O]z-represents poylol selected from the group consisting of (a) polyester polyol triol having a molecular weight of 200 to 10,000, (b) polyether glycol having a molecular weight of 200 to 10,000, and (c) polyester polyol diol having a molecular weight of 10,000 or less; m represents an integer of 2 to 10, n represents an integer of 0 to 18; p represents an integer of 2 to 10, and v, w, x and y each represent an integer of 0 to 100.]

In the present invention, the aliphatic polycarbonate resin and the copolyester polymer are prepared and coextruded into resin compositions, respectively. Here, the resin composition may be prepared in a master batch pallet type.

As occasion demands, an additive commonly used in manufacturing films or sheets, such as a pigment, a dye, a filler, an antioxidant, a UV blocker, an antistatic agent, an antiblocking agent, a slip agent, or the like, may be added into the resin composition, and the kind thereof is not limited.

Next, a method of manufacturing the multilayer film of the present invention will be described in more detail.

In another general aspect, a method for manufacturing a multilayer film, includes:

a) preparing a first resin composition containing aliphatic polycarbonate;

b) preparing a second resin composition containing copolyester polymer; and c) melting the first resin composition and the second resin composition and then coextruding the first resin composition and the second resin composition using a blown or casting type of film molding machine.

In the present invention, a preferable melt temperature range at the time of coextrusion is 120 to 210° C. for the aliphatic polycarbonate, and 160 to 250° C. for the copolyester polymer. The coextrusion is performed by using a blown or casting type of film molding machine. If the melt temperature thereof is below the above temperature range, a process rate is deteriorated and an adhesive strength between layers is decreased. If the melt temperature thereof is above the temperature range, excessive thermal degradation may occur, causing bubbles due to products of the thermal degradation in the sheet.

In addition, two or more layers may be laminated by regulating a type of die at the time of coextrusion. In other words, a two-layer structure of a first resin composition/a second resin composition, or a three-layer structure of a second resin composition/a first resin composition/a second resin composition may be laminated.

Other features and aspects will be apparent from the following detailed description, the drawings, and the claims.

DETAILED DESCRIPTION OF EMBODIMENTS

Figure 1:
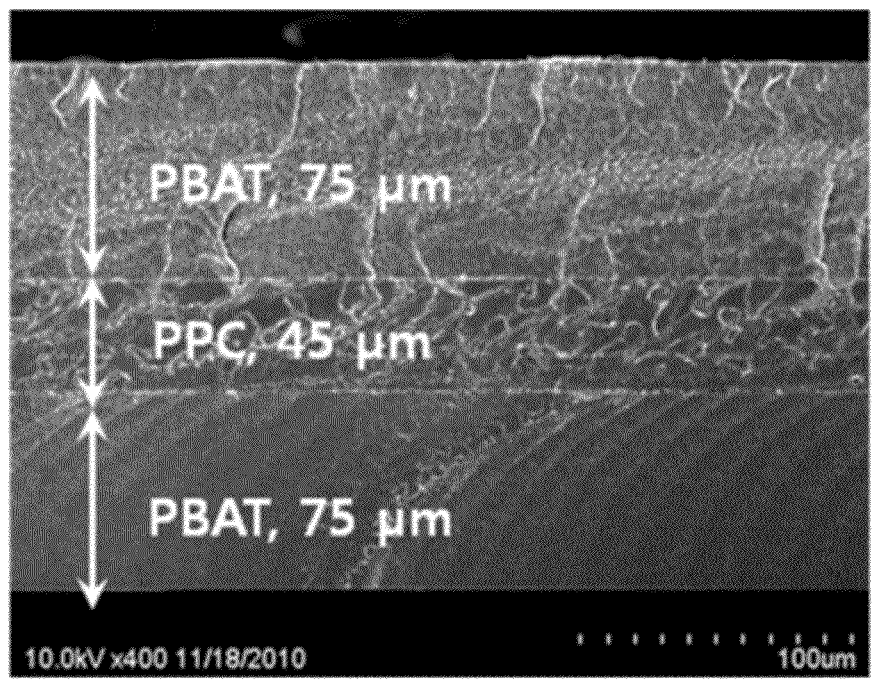
FIG. 1 is an scanning electron microscope (SEM) image of a cross-sectional view of a multilayer film according to Example 1 of the present invention.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the present invention will be described in detail with reference to the Examples, which is not intended to limit the present invention.

Hereinafter, physical properties were measured by the following methods.

(Weight Average Molecular Weight)

A weight average molecular weight was measured by using Gel Permeability Chromatography using tetrahydrofuran (THF) as a solvent (Room temperature GPC, Agilent 1200 HPLC).

(Film Thickness)

Thicknesses at several points of a multilayer film were measured (TOYOSEIKI Thickness Meter Model: B-1), and an average value thereof was used.

(Delamination)

A multilayer film was cut to a size of 5 cm of width and 20 cm of length, adhesive tapes were attached onto both surfaces of the film such that the adhesive tape overlap all the width of the film and is 5 cm in a length direction. Then, when the adhesive tapes were pulled off from both surfaces of the film in a direction vertical to the surfaces of the film, it is observed whether or not respective layers of the multilayer film are delaminated from each other. A case in which respective layers were not laminated from each other, with up to three trials, was determined to be not laminated.

(Tensile Strength and Elongation)

Tensile strength and elongation were measured according to ASTM D-638 by using Universal Testing Machine (INSTRON 4301).

(Haze)

A multilayer film is cut to a size having a film width of 7 cm and a film length of 7 cm. Haze was measured two times or more, and an average value thereof was used (Haze Meter 300A, NIPPON DENSHOKU).

(Oxygen Permeability)

Oxygen permeability was measured by using MOCON OX-TRAN equipment (Model 2161).

(Water Permeability)

Water permeability was measured by using MOCON PERMATRAN-W equipment (Model 3133).

(Film Shrinkage Ratio)

The stretched multilayer film is cut to a size having a film width of 6 cm and a film length of 6 cm, which was then retained in a warm water bath at which a temperature is uniformly maintained, for a predetermined time period (30 seconds), and then a length difference thereof was measured.

Example 1

A three-layer film of PBAT/PPC/PBAT was produced by putting polypropylene carbonate (PPC, produced by SK Energy Company) having a weight average molecular weight of 150,000 and PBAT (Ecoflex F BX7011, BASF Company), which is copolyester polymer, into an extruder, followed by melting and then coextrusion through a multilayer blown molding machine. Here, at the time of coextrusion, the polypropylene carbonate was melt extruded at an extruder temperature of 120/160/165/175/180° C., and the copolyester polymer was melt extruded at an extruder temperature of 160/160/170/175/180° C.

As the measurement result, the manufactured multilayer film has a thickness of 190 μm, and thicknesses of respective layers were 75 μm/40 μm/75 μm (FIG. 1). Physical properties of the manufactured film were measured and then the results were tabulated in Table 1.

Example 2

Figure 2:
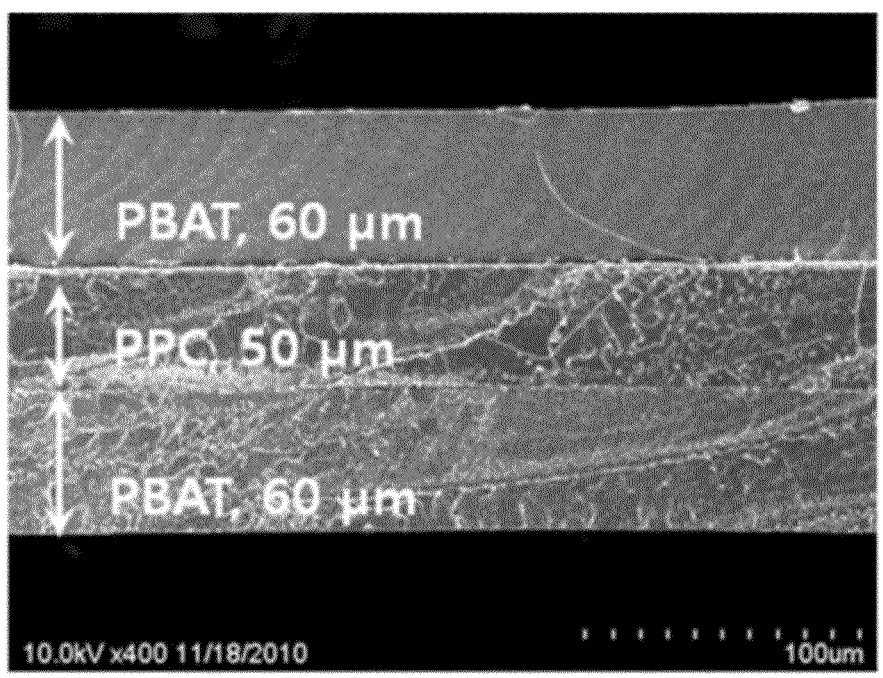
FIG. 2 is a scanning electron microscope (SEM) image of a cross-sectional view of a multilayer film according to Example 2 of the present invention.

A multilayer film was manufactured by using the same equipment and resin as Example 1 while a thickness ratio of a PPC layer was regulated. Here, thicknesses of respective layers (PBAT/PPC/PBAT) were 60 μm/50 μm/60 μm, and overall thickness of the film was 170 μm (FIG. 2). Physical properties of the manufactured film were measured and the results were tabulated in Table 1.

Comparative Example 1

Physical properties of PBAT (Ecoflex F BX7011, BASF Company), which is a copolyester polymer film alone, as a control group against the films according to the present invention, were measured, and then the results were tabulated in Table 1.

TABLE 1

| | Unit | Example 1 | Example 2 | Comparative example 1 |
|---|---|---|---|---|
| Delamination | | Not delaminated | Not delaminated | |
| Film thickness | μm | 190 | 170 | 170 |
| Yield point (MD) | Kg/cm² | 155 | 180 | 80 |
| Yield point (TD) | Kg/cm² | 155 | 180 | 75 |
| Break point (MD) | Kg/cm² | 330 | 270 | 460 |
| Break point (TD) | Kg/cm² | 350 | 160 | 460 |
| Elongation at break (MD) | % | 520 | 480 | 600 |
| Elongation at break (TD) | % | 520 | 350 | 550 |
| Haze | | 76 | 70 | 81 |
| Oxygen permeability (23° C., RH 0%) | cc/m² day | 36 | 26 | 290 |
| Water permeability (38° C., RH 100%) | cc/m² day | 77 | 62 | 214 |

As shown in Table 1, it can be confirmed that the films of Examples 1 and 2 according to the present invention are multilayer films no longer requiring a separate adhesive or a tie layer, but retain excellent film characteristics, with respect to tension, elongation, and haze, which are physical properties of a PBAT film made of a copolyester polymer, and superior oxygen permeability and water permeability, as compared with Comparative example 1. According to the present invention, costs of raw material can be saved and manufacturing costs can be remarkably reduced due to process simplification.

The multilayer film according to the present invention no longer requires an adhesive or a tie layer and has improved physical properties due to superior adhesive property between respective resins.

Further, the multilayer film according to the present invention is usable a barrier film due to excellent film characteristics of the copolyester polymer and excellent barrier property of the aliphatic polycarbonate, and usable as a packaging material having a superior barrier property as a film, a sheet, a fabric, or the like, due to excellent oxygen and moisture barrier properties.

What is claimed is:

1. A multilayer film comprising,
   a base layer, wherein the base layer has an average thickness of 40 μm to 50 μm and consists of an aliphatic polycarbonate; and
   a surface layer laminated on a top surfaces of the base layer and on a bottom surface of the base layer, wherein each surface layer has an average thickness of 60 μm to 75 μm and comprises one or more copolyester polymer selected from poly(butylene adipate-co-terephthalate) and poly(butylene succinate);

wherein the aliphatic polycarbonate is a copolymer of carbon dioxide and one or more epoxide compounds, wherein the one or more epoxide compounds are selected from the group consisting of ($C_2$-$C_{10}$) alkylene oxide substituted or unsubstituted with halogen or alkoxy; ($C_4$-$C_{20}$) cycloalkylene oxide substituted or unsubstituted with halogen or alkoxy; and ($C_8$-$C_{20}$) styrene oxide substituted or unsubstituted with halogen, alkoxy, alkyl, or aryl, and the aliphatic polycarbonate copolymer has a glass transition temperature (Tg) of 0 to 40° C., and wherein the aliphatic polycarbonate is polypropylene carbonate;

wherein the base layer and the surface layer are laminated by coextrusion, wherein the coextrusion is performed by melt extruding the aliphatic polycarbonate at a temperature of 120 to 210° C. and the copolyester polymer at a temperature of 160 to 250° C. and then coextruding the aliphatic polycarbonate and the copolyester polymer using a blown or casting type of film molding machine, and wherein the multilayer film is a three-layer film consisting of the base layer and the surface layers and does not include an adhesive layer or a tie layer, and the base layer and the surface layers are not delaminated in a delamination test using adhesive tape when performed on the multilayer film having an average thickness of 170 μm to 190 μm, a width of 5 cm and a length of 20 cm.

2. A method for manufacturing a multilayer film, comprising:

a) preparing a first resin composition consisting of an aliphatic polycarbonate copolymer, wherein the aliphatic polycarbonate copolymer is obtained by reacting carbon dioxide and one or more epoxide compounds, wherein the one or more epoxide compounds is selected from the group consisting of ($C_2$-$C_{10}$) alkylene oxide substituted or unsubstituted with halogen or alkoxy; ($C_4$-$C_{20}$) cycloalkylene oxide substituted or unsubstituted with halogen or alkoxy; and ($C_8$-$C_{20}$) styrene oxide substituted or unsubstituted with halogen, alkoxy, alkyl, or aryl, and the aliphatic polycarbonate copolymer has a glass transition temperature (Tg) of 0 to 40° C., wherein the aliphatic polycarbonate is polypropylene carbonate;

b) preparing a second resin composition comprising one or more copolyester polymer selected from poly(butylene adipate-co-terephthalate) and poly(butylene succinate);

c) melting the first resin composition and the second resin composition;

d) coextruding the first resin composition and the second resin composition using a blown or casting type of film molding machine, wherein the coextrusion is performed by melt extruding the first resin composition at a temperature of 120 to 210° C. and the second resin composition at a temperature of 180 to 250° C.; and e) forming a multilayer film, wherein the multilayer film is a three-layer film consisting of a base layer, a surface layer laminated on a top surface of the base layer and a surface layer laminated on a bottom surface of the base layer, and the multilayer film does not include an adhesive layer or a tie layer, and wherein the base layer is formed from the first resin composition and has an average thickness of 40 μm to 50 μm, and each surface layer is formed from the second resin composition and has an average thickness of 60 μm to 75 μm;

wherein the base layer and the surface layers are not delaminated in a delamination test using adhesive tape when performed on the multilayer film having an average thickness of 170 um to 190 um, a width of 5 cm and a length of 20 cm.

* * * * *